United States Patent
Harris et al.

(10) Patent No.: US 10,686,570 B2
(45) Date of Patent: Jun. 16, 2020

(54) COORDINATED MULTIPOINT COMMUNICATION

(71) Applicant: NOKIA SOLUTIONS AND NETWORKS OY, Espoo (FI)

(72) Inventors: John Harris, Whitefish Bay, WI (US); Roy Yang, Buffalo Grove, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 229 days.

(21) Appl. No.: 15/332,792

(22) Filed: Oct. 24, 2016

(65) Prior Publication Data
US 2018/0115397 A1  Apr. 26, 2018

(51) Int. Cl.
*H04J 3/08*    (2006.01)
*H04L 5/00*    (2006.01)
*H04J 11/00*   (2006.01)
*H04W 72/04*   (2009.01)

(52) U.S. Cl.
CPC ........ *H04L 5/0035* (2013.01); *H04J 11/0053* (2013.01); *H04W 72/0426* (2013.01)

(58) Field of Classification Search
CPC .......................... H04W 72/0426; H04W 72/04; H04L 5/0035; H04L 5/00
See application file for complete search history.

(56) References Cited

U.S. PATENT DOCUMENTS

| | | | |
|---|---|---|---|
| 2014/0148179 | A1 | 5/2014 | Das et al. |
| 2014/0301251 | A1* | 10/2014 | Chen ............ H04W 72/02 370/278 |
| 2016/0211955 | A1* | 7/2016 | Wu ................. H04W 24/02 |
| 2016/0337157 | A1* | 11/2016 | Papasakellariou ..... H04B 3/232 |
| 2017/0251466 | A1* | 8/2017 | Astely ............... H04L 5/0037 |
| 2017/0318600 | A1* | 11/2017 | Shi ................ H04W 72/1215 |

OTHER PUBLICATIONS

International Search Report and Written Opinion International Application No. PCT/EP2017/075627 dated Feb. 5, 2018.

* cited by examiner

*Primary Examiner* — Abdelillah Elmejjarmi
(74) *Attorney, Agent, or Firm* — Squire Patton Boggs (US) LLP (57) ABSTRACT

Various communication systems may have various mechanisms for handling data loss. For example, certain wireless communication systems may benefit from appropriate handling of uplink coordinated multipoint helper data loss on a subset of symbols within a transmission time interval. A method can include receiving helper data corresponding to a portion of an uplink subframe. The method can also include performing coordinated multipoint processing on the portion of the uplink subframe using the helper data.

14 Claims, 8 Drawing Sheets

COORDINATED MULTIPOINT COMMUNICATION

BACKGROUND

Field

Various communication systems may have various mechanisms for handling data loss. For example, certain wireless communication systems may benefit from appropriate coordinated multipoint communication methods and apparatuses.

Description of the Related Art

Coordinated Multipoint (CoMP) uplink (UL) reception can provide significant performance benefits to uplink capacity and coverage in cellular networks. This technique utilizes multiple antenna data from multiple antenna site locations, which may or may not belong to the same physical cell, to enhance the quality of the desired signal as well as decrease the spatial interference through an advanced receiver, such as, for example, an interference rejection combining (IRC) receiver.

By pooling the serving cell and helper cell antenna data together, a higher order IRC receiver can be used to exploit the spatial separation between the user equipment (UE) in the serving cell as opposed to a number of interferers in the helper cells. Subsequently, the IRC receiver generates coefficients, or weights (for example one for each antenna) for antenna combining such that the undesired interferers are suppressed.

Conventionally, a helper cell subframe is discarded if a portion of the helper data, for example one or more symbols, is too late or is lost. This approach ensures that the receiver falls back to using the antenna data from the serving cell.

SUMMARY

According to certain embodiments, a method can include receiving helper data corresponding to a portion of an uplink subframe. The method can also include performing coordinated multipoint processing on the portion of the uplink subframe using the helper data.

In certain embodiments, an apparatus can include at least one processor and at least one memory including computer program code. The at least one memory and the computer program code can be configured to, with the at least one processor, cause the apparatus at least to receive helper data corresponding to a portion of an uplink subframe. The at least one memory and the computer program code can also be configured to, with the at least one processor, cause the apparatus at least to perform coordinated multipoint processing on the portion of the uplink subframe using the helper data.

A non-transitory computer readable medium can, according to certain embodiments, be encoded with instructions that, when executed in hardware, perform a process. The process can include receiving helper data corresponding to a portion of an uplink subframe. The process can also include performing coordinated multipoint processing on the portion of the uplink subframe using the helper data.

An apparatus, in certain embodiments, can include means for receiving helper data corresponding to a portion of an uplink subframe. The apparatus can also include means for performing coordinated multipoint processing on the portion of the uplink subframe using the helper data.

According to certain embodiments, a computer program product can be encoded with instructions for performing a process. The process can include receiving helper data corresponding to a portion of an uplink subframe. The process can also include performing coordinated multipoint processing on the portion of the uplink subframe using the helper data.

BRIEF DESCRIPTION OF THE DRAWINGS

For proper understanding of the certain embodiments of the invention, reference should be made to the accompanying drawings, wherein.

DETAILED DESCRIPTION

Most recently, progress has been made to transport antenna data over a more cost-effective packet networks, for example Ethernet from a helper cell to a serving cell. This also fits into the 5G architecture where antenna data from different sites are transported via Ethernet to a radio access network (RAN) cloud in which UL CoMP is executed on virtual machines.

The packet networks may contain multiple hops of routers and switches which introduces more latency. The network can also add impairment to the traffic, for example, packet loss due to bad checksum, packet reordering due to dynamic routing and delay and jitter due to network congestion, and so on. This latency and jitter can be even worse in virtual networks where virtual machines may have inefficient time keeping through virtual interfaces.

In LTE, there is a stringent timing requirement for the uplink hybrid automatic repeat request (HARQ) loop where the uplink cyclic redundancy check (CRC) result needs to go over the air 4 milliseconds after the UE's uplink transmission is over the air, which in turn, places significant constraints in the time of arrival for the neighbor cell's antenna data. As a result, there is a high probability for the serving cell to receive only a portion of the helper data before the UL CoMP deadline due to a lost packet or a late packet due to network impairment.

As mentioned above, packet networks such as Ethernet can be used to transport helper cell antenna data to the serving cell to perform UL CoMP. This may also be applied in a 5G cloud architecture where antenna data from different sites can be transported via Ethernet to the Cloud RAN and UL CoMP can be executed on virtual machines.

As also mentioned above, packet networks can have limitations or impairments such as delay, jitter, loss, and so on. LTE may continue to have stringent timing requirements for the uplink HARQ. These timing requirements can place a significant constraint on the arrival time of the antenna data from the helper cell. As a result, the serving cell may have only received a portion of the helper data before the deadline due to packet loss or excessive latency on the transport path.

Certain embodiments may be configured to take advantage of the partial helper data for CoMP purposes and make better use of the network efficiency. Thus, certain embodiments may render the existing method sub-optimal by comparison to approaches according to certain embodiments in which partial UL CoMP is provided.

Certain embodiments of the invention can relate to a partial UL CoMP method whereby the receiver performs CoMP on the portion of the subframe where helper data is available and does serving cell only equalization on the portion of the uplink subframe where helper data is unavailable. The method can also involve combining the two portions thereafter to form the complete UL subframe data for the decoder. This method can take maximal advantage of the network efficiency. Several embodiments of partial UL CoMP are presented and the associated antenna weights calculation are addressed.

Figure 1:
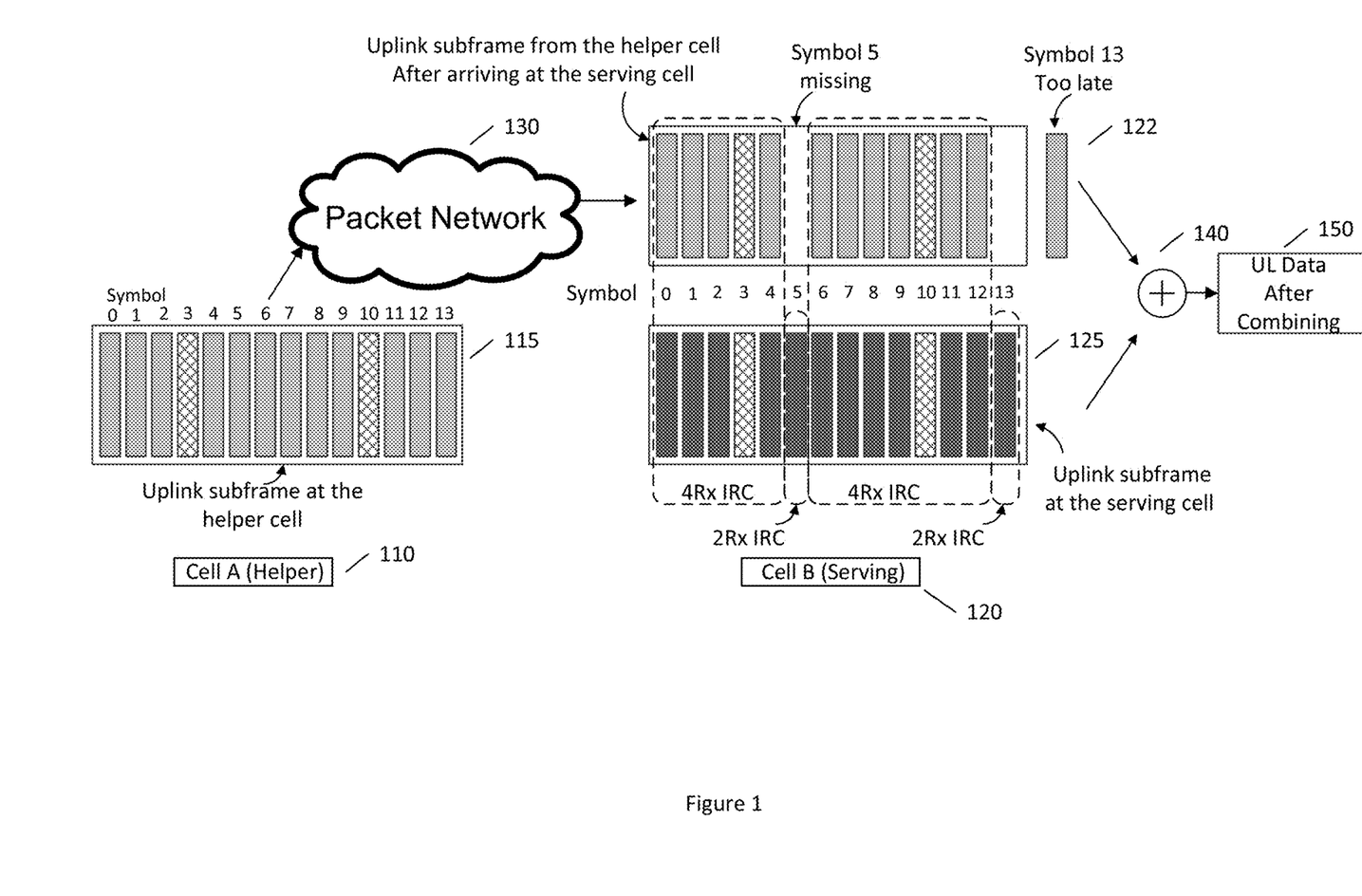
FIG. 1 illustrates partial uplink coordinated multipoint processing at cell B with partially received cell A helper data, according to certain embodiments.

FIG. 1 illustrates partial uplink coordinated multipoint processing at cell B with partially received cell A helper data, according to certain embodiments. Certain embodiments relate to a method of doing partial UL CoMP with fragments of helper data in case of impairment of packet network 130.

As an example, as shown in FIG. 1, there can be two cells in a network: cell A 110 and cell B 120. In this example, cell A 110 is the helper cell of cell B 120, and cell B 120 is the serving cell of a UE (not shown).

The uplink signal from the UE can be received by both cell B 120 and cell A 110. The uplink signal as received at the helper cell is shown at 115, whereas the uplink signal as received at the serving cell is shown at 125. One subframe (1 ms) worth of the uplink signal may be required in order to decode the UE data. Each subframe can contain 14 symbols, which are labeled symbol 0 to symbol 13 in FIG. 1. Out of these symbols, symbol 3 and symbol 10 are reference symbols for channel estimation purposes. The term reference symbols can also include, without limitation, pilot signals and demodulation reference symbols (DRMS). In order to do UL CoMP, the uplink subframe from cell A 110 can be sent over a packet network 130 to cell B 120.

However, upon arrival, the packet that contains symbol 5 of the uplink subframe from cell A 110 may be dropped by the network, for example due to bad checksum, yielding the subframe received at the serving cell from the helper cell at 122. Moreover, the packet that contains symbol 13 may arrive too late, for example due to network congestion, and may miss the deadline for UL CoMP. As a result, cell B 120 may receive only a portion of the uplink subframe data from cell A 110 before the deadline for UL CoMP operation.

The loss of symbol 13 and the late arrival of symbol 5 are just two examples of things that could happen to any of the symbols. Packet loss or delay can happen at any symbols, no matter whether it is data symbol or reference symbol. Here symbol 5 and symbol 13 are just examples. The same is true for other examples below, they are merely illustrative examples.

Although other antenna arrangements are possible, in this case it can be assumed that each cell has two antennas. Certain embodiments propose that cell B 120 can perform UL CoMP on the portion of the uplink subframe that has arrived from cell A 110 in time and can perform serving cell only antenna combining on the portion of the uplink subframe that does not have cell A 110 data.

Specifically, in this example, on symbol 0, 1, 2, 4, 6, 7, 8, 9, 11, and 12, 4Rx IRC is chosen. This 4Rx IRC can use symbol 3 and symbol 10 from both cells to create the best IRC weights (rank=4) to combine the 4 antennas together. On symbol 5 and symbol 13, since there is no helper data from Cell A 110, because symbol 13 is too late, 2Rx IRC can be chosen. This 2Rx IRC can use symbol 3 and symbol 10 of Cell B 120 to create the best IRC weights (rank=2) to combine the 2 antennas of cell B 120 together. The weights can be normalized such that the combined signal would have identical dynamic range.

Subsequently, the 4Rx IRC combined symbols and 2Rx IRC combined symbols can be grouped together at 140 to form the full uplink subframe for the next stage 150 of uplink processing. The next stage 150 can include inverse discrete Fourier transform (IDFT), log-likelihood ratio (LLR) generation and decoding.

Figure 2:
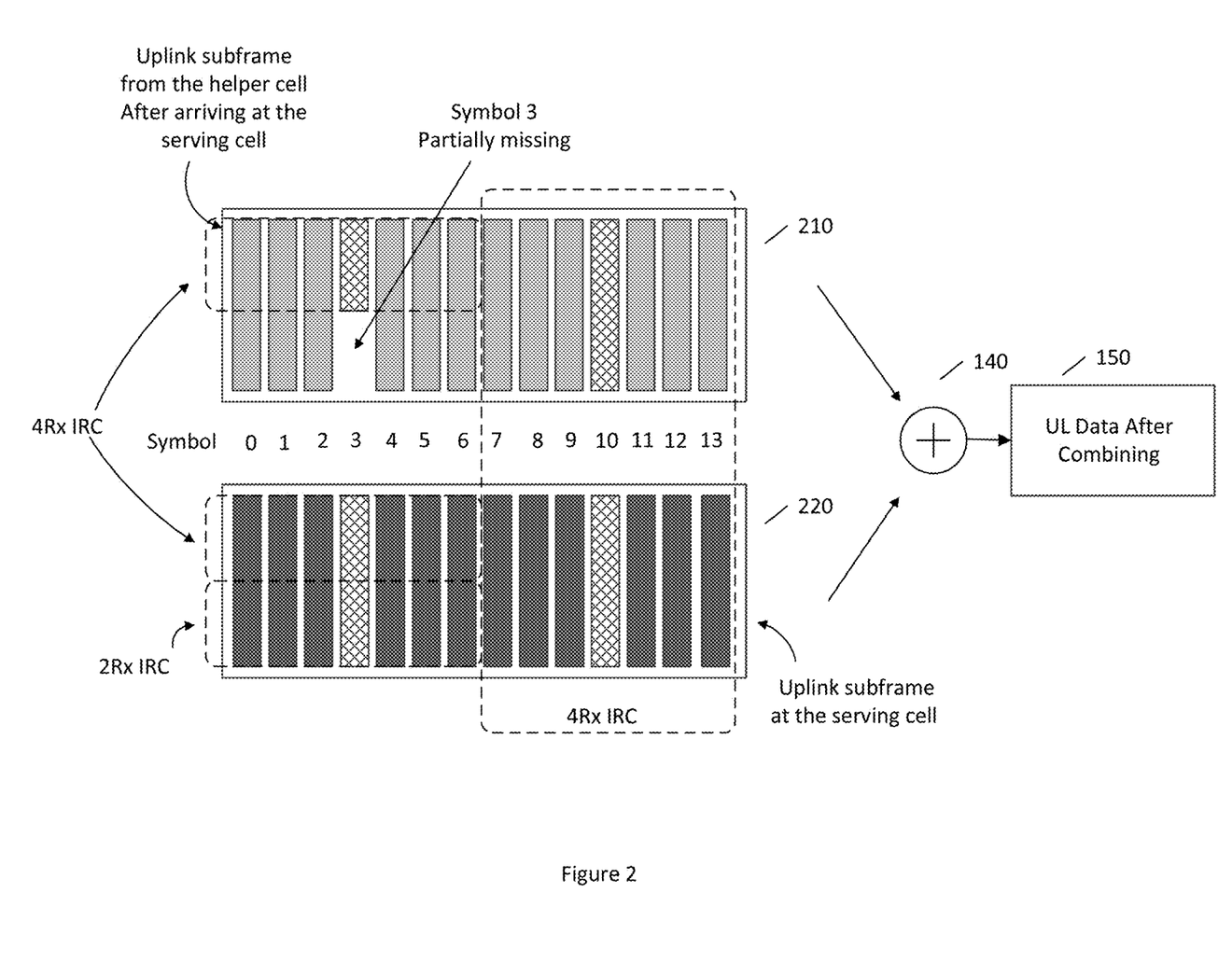
FIG. 2 illustrates partial uplink coordinated multipoint processing at cell B with a partial reference symbol from cell A, according to certain embodiments.

FIG. 2 illustrates partial UL CoMP at cell B with a partial reference symbol from cell A, according to certain embodiments. As shown in FIG. 2, a part of the reference symbols, symbol 3 and symbol 10, may be lost. A similar processing can be applied in this case.

The packet size of the helper data can be restricted by the maximum transmission unit (MTU) size of the switch/routers, which is typically set at 1500 bytes. In another situation, the eNB vendor can deliberately control the packet size to a small amount (for example, 512 bytes) in order to reduce jitter even if the network supports jumbo frames (which may be around 9000 bytes). Under both cases, there is a possibility that data for any particular symbol needs to be segmented and sent in several packets.

In the example of FIG. 2, symbol 3 is sent in 2 packets and one of the packets is dropped in the packet network. The uplink signal as received from the helper cell via the packet network is shown at 210, whereas the uplink signal as received at the serving cell B is shown at 220. For the bottom portion of the resource block from cell A, there is no reference symbol available.

Certain embodiments propose that cell B performs UL CoMP on the top portion of the resource block for symbol 0, 1, 2, 4, 5, and 6 with cell A and cell B data. Additionally, cell B can perform cell B only antenna combining on the bottom portion of the resource block of the same symbols 0, 1, 2, 4, 5, and 6. Specifically, 4Rx IRC on the resource blocks where the symbol 3 data is available from the helper cell, 2Rx IRC on the resource blocks where symbol 3 from helper data is missing.

Again, the IRC weights between 4Rx IRC and 2Rx IRC can be normalized to ensure identical dynamic range between the 2 sets of combined signals. Subsequently, the 4Rx IRC combined resource blocks and 2Rx IRC combined resource blocks can be grouped together at 140 to form the full symbol and full subframe thereafter for the next stage 150 of uplink processing. The next stage 150 can include IDFT, LLR generation and decoding.

Certain embodiments can be extended to situations when one or more of the carriers for one or more reference symbols is missing or partially received in a transmission time interval (in one example symbol 3 and symbols 10 are the reference symbols). When the reference symbol(s) are completely missing, UL CoMP may be impossible and the received helper data symbols can just be discarded.

Figure 3:
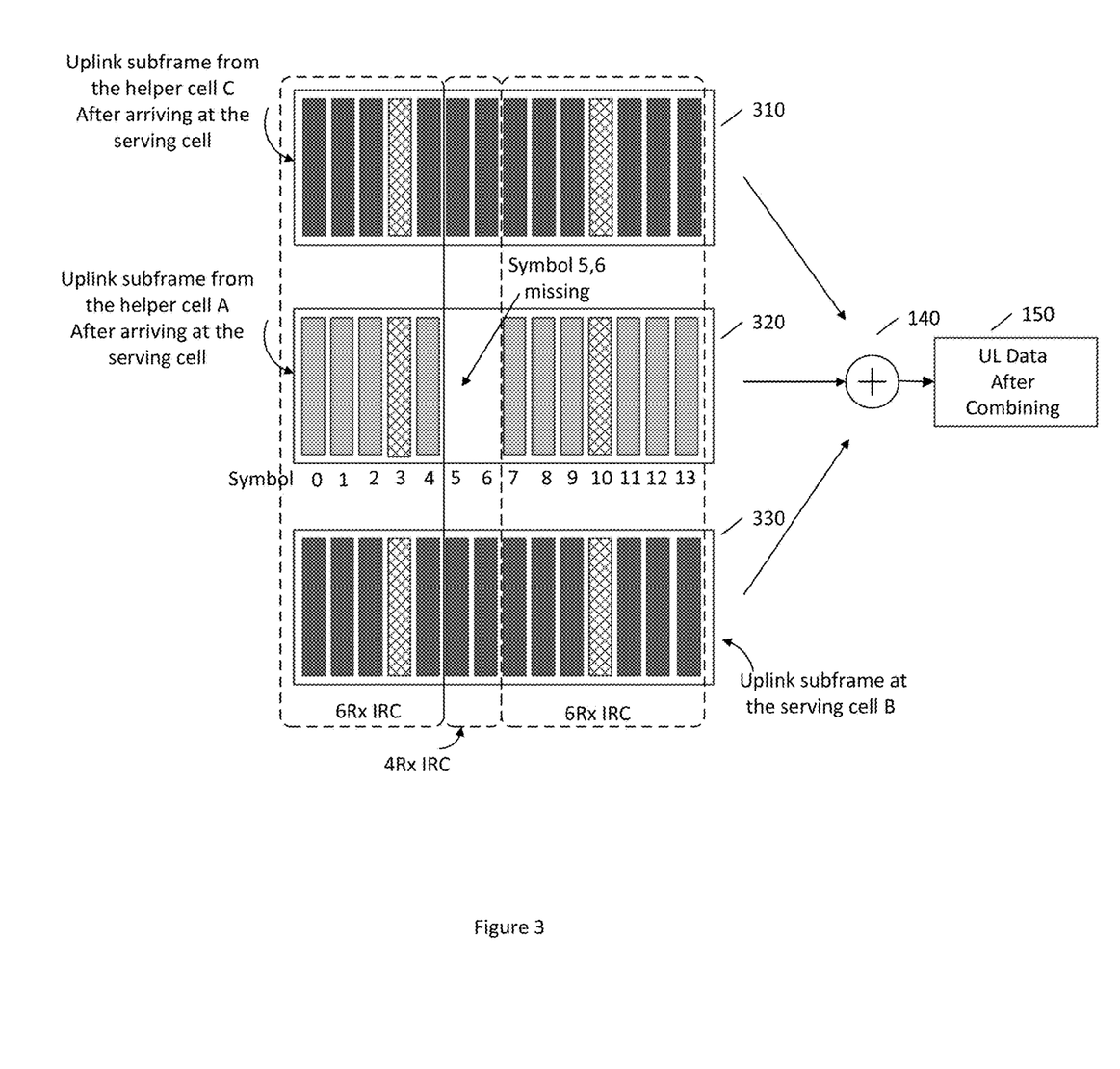
FIG. 3 illustrates partial UL CoMP at cell B with full helper data from cell C and partially received helper data from cell A, according to certain embodiments.

FIG. 3 illustrates partial UL CoMP at cell B with full helper data from cell C and partially received helper data from cell A, according to certain embodiments. As shown in FIG. 3, certain embodiments of partial UL CoMP can involve a rank reduction of the IRC receiver when there is more than one helper cell.

In FIG. 3, cell B is the serving cell. There are two helper cells in this example, namely cell A and cell C. As shown in FIG. 3, uplink helper subframe from cell A has lost symbol 5 and symbol 6, whereas the uplink helper subframe from cell C arrives in Cell B with no loss. The uplink signal as received from helper cell C via the packet network is shown at 310, the uplink signal as received from helper cell A via the packet network is shown at 320, and the uplink signal as received at the serving cell B is shown at 330.

Certain embodiments propose that cell B can perform UL CoMP over symbol 0, 1, 2, 4, 7, 8, 9, 11, 12, and 13 with helper data from Cell A and Cell C, and perform UL CoMP over symbol 5 and 6 with the helper data from Cell C only. Specifically, certain embodiments can apply 6Rx IRC over the symbols that have data from both helper cells and 4Rx IRC over the symbols that have data from only one helper cell. If there were some symbols without helper data at all, 2Rx IRC could be applied based on the serving cell's data only.

Again, the IRC weights between 6Rx IRC and 4Rx IRC (and/or 2RX if used) can be normalized to ensure an identical dynamic range between the 2 (or more) sets of combined signals. Subsequently, the 6Rx IRC combined symbols and 4Rx IRC combined symbols (and the 2Rx symbols if used) can be grouped together at 140 to form the full subframe. The full subframe can be provided for the next stage 150 of uplink processing, which can include IDFT, LLR generation, and decoding.

There are other embodiments of the partially received helper data, such as a mix and match of the embodiments listed above or embodiments with additional helper cells.

Figure 4:
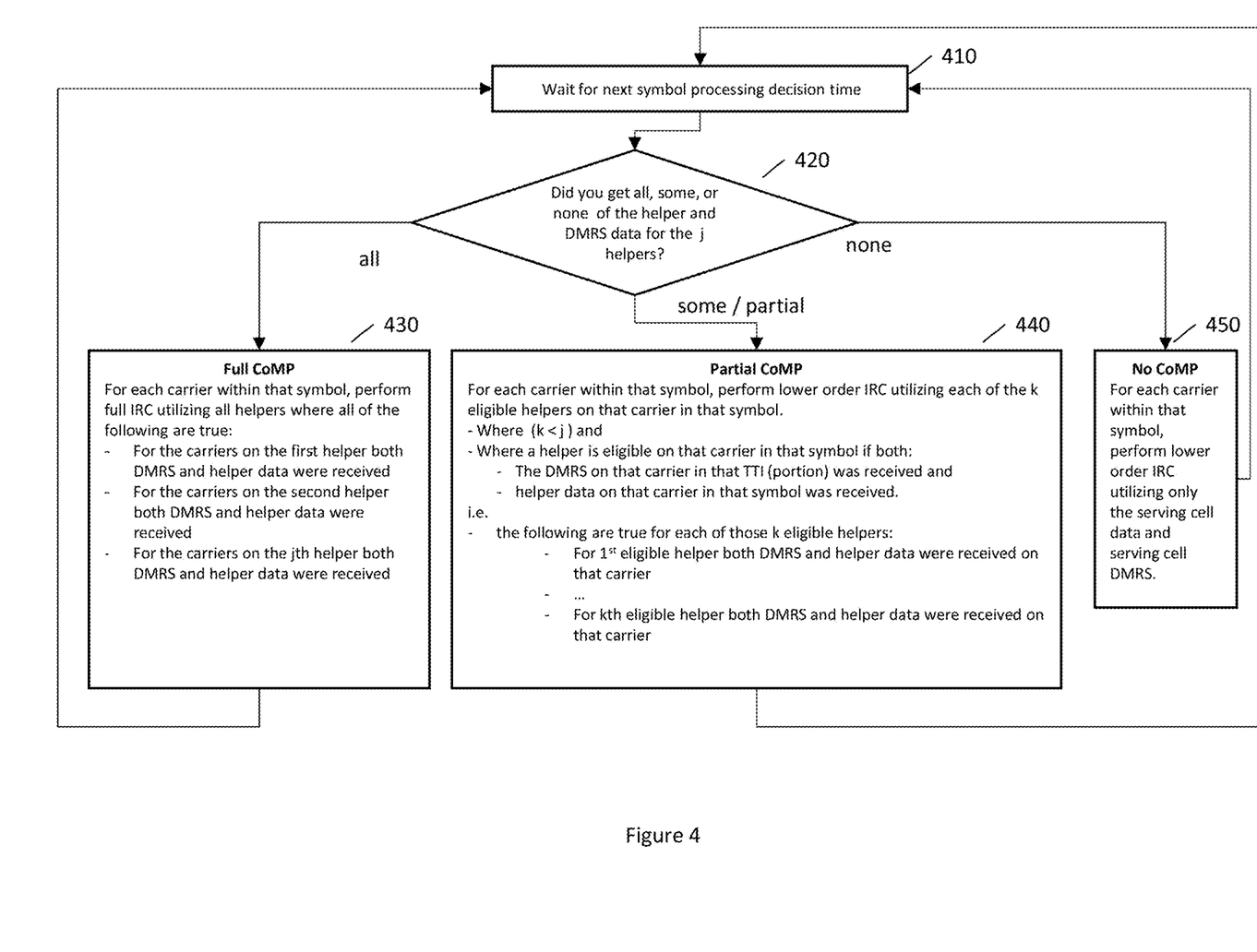
FIG. 4 illustrates a flow chart of a coordinated multipoint method according to certain embodiments.

FIG. 4 illustrates a flow chart of a coordinated multipoint method according to certain embodiments. The approach of FIG. 4 can be applicable in a case where there are up to j helpers available.

The process illustrated in FIG. 4 can begin at 410 with waiting for a next symbol processing decision time. As mentioned above, this time may be dictated by, for example, a wireless communication standard such as a a 5G standard.

Next, at 420, a determination can be made as to whether all, some, or none of the helper data was received and whether all of the demodulation reference symbol (DMRS) data was received for each of the helpers. If all the relevant data was received, then full CoMP processing can be used at 430. This can involve the processing illustrated by way of example in FIG. 4 at 430. For example, for each carrier within a symbol, the system can utilize full IRC on that carrier utilizing the $1^{st}$ through the jth helper data where the system: received from the $1^{st}$ cell, both the helper data, and the DMRS on that carrier and received from the $2^{nd}$ cell, both the helper data, and the DMRS on that carrier and . . . received from the $j^{nd}$ cell, both the helper data, and the DMRS on that carrier.

If some helper data was received, but not all, then partial CoMP can be performed at 440. This can involve the processing illustrated by way of example in FIG. 4 at 430. For example, for each carrier within the symbol where there is only partial helper data, lower order IRC can be performed utilizing k eligible helpers on that carrier in that symbol. In this case, k would be less than j. A helper can be considered eligible on a given carrier in a given symbol if both the demodulation reference symbol (DMRS) on that carrier in the transmission time interval (TTI) portion was received and the helper data on that carrier in that symbol was received. For example, the following can be true for each of those k eligible helpers: use the 1st eligible helper where received both DMRS and helper data on that carrier; use the 2nd eligible helper where received both DMRS and helper data on that carrier; . . . ; and use the kth eligible helper where received both DMRS and helper data on that carrier.

If no helper data was received, then at 450 for each carrier within that symbol lower order IRC can be performed. This can involve IRC using only the serving cell data.

Figure 5:
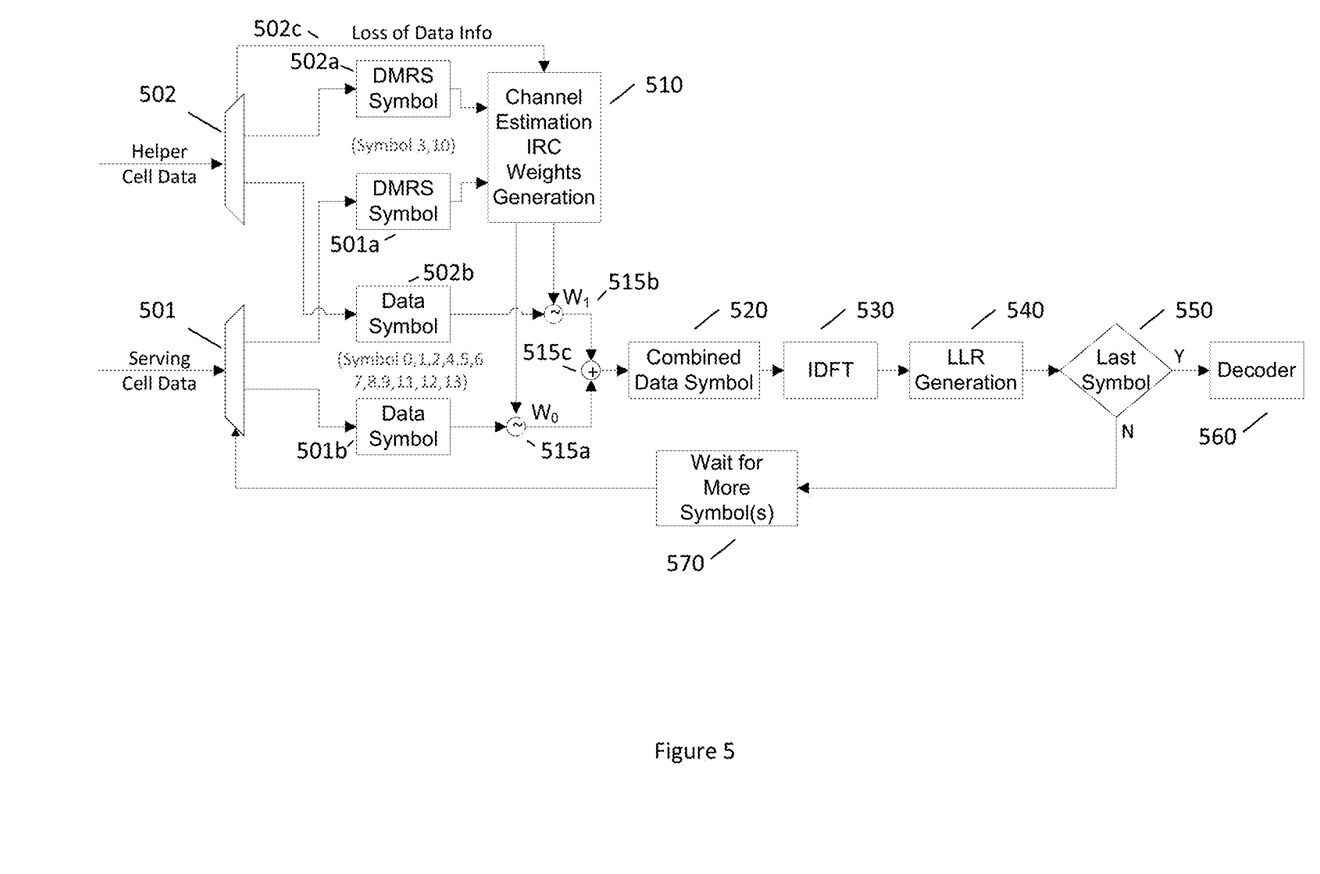
FIG. 5 illustrates a receiver according to certain embodiments.

FIG. 5 illustrates a receiver according to certain embodiments. This may be a UL CoMP receiver. The receiver can receive serving cell data at input 501 and helper cell data at input 502. Each of inputs 501 and 502 can provide respective DMRS symbols 501a, 502a and data symbols 501b, 502b. The DMRS symbols 501a, 502a can be provided to a channel estimation and IRC weights generation block 510. The channel estimation and IRC weights generation block 510 can also have access to the loss of data information 502c, as well as either data or DMRS symbol, and can make an appropriate decision, either local only or CoMP on per symbols basis, by tweaking the weights $W_0$ at 515a and $W_1$ at 515b before combining.

The symbol numbers shown in FIG. 5 correspond to the examples shown in FIGS. 1 through 3, in which symbols 3 and 10 are reference symbols. If other symbols are used as reference symbols, those symbols could be provided to block 510.

Block 520 can prepare a combined data symbol based on the weights and combiner 515c and further taking into account any normalizing that may need to be done. The normalized output can be provided to IDFT 530 and LLR generation 540. A determination can be made at 550 whether a last symbol has been or should have been received. When a last symbol is or should have been received, the set of symbols can be provided to a decoder 560. Otherwise, the system can wait for more symbols at 570.

Blocks 510 and 520 can be variously implemented in hardware, software running on hardware, or the like. For example, blocks 510 and 520 can be implemented using one or more processors and one or more memories including computer program code.

Figure 6:
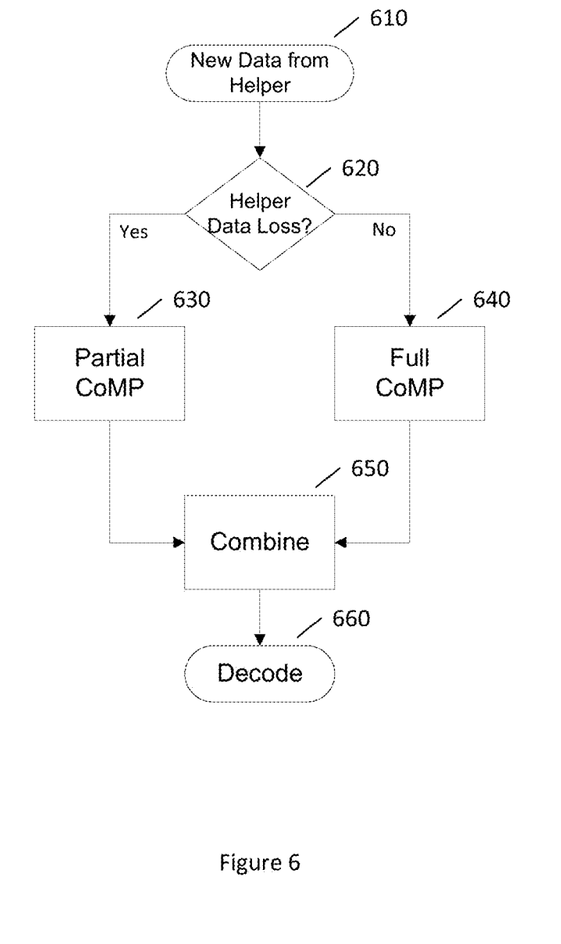
FIG. 6 illustrates a coordinated multipoint method according to certain embodiments.

FIG. 6 illustrates a coordinated multipoint method according to certain embodiments. The illustrated method can be viewed as a high level representation. Additional processing can be performed, such as illustrated in FIG. 5, or otherwise. As shown in FIG. 6, the process can initiate at 610 whenever there is new data from a helper cell. If so, then the system can determine, at 620, whether there is data loss. If there is no data loss, full CoMP processing can be performed at 640, taking into account all the helper and serving cell data. If there is at least some data loss, then partial CoMP process can be performed at 630, taking into account whatever usable helper data is available.

The outputs of the full and partial CoMP processing paths can be combined at 650, together with the output of any serving cell only processing (not shown). The combined output can be decoded at 660, as shown.

Figure 7:
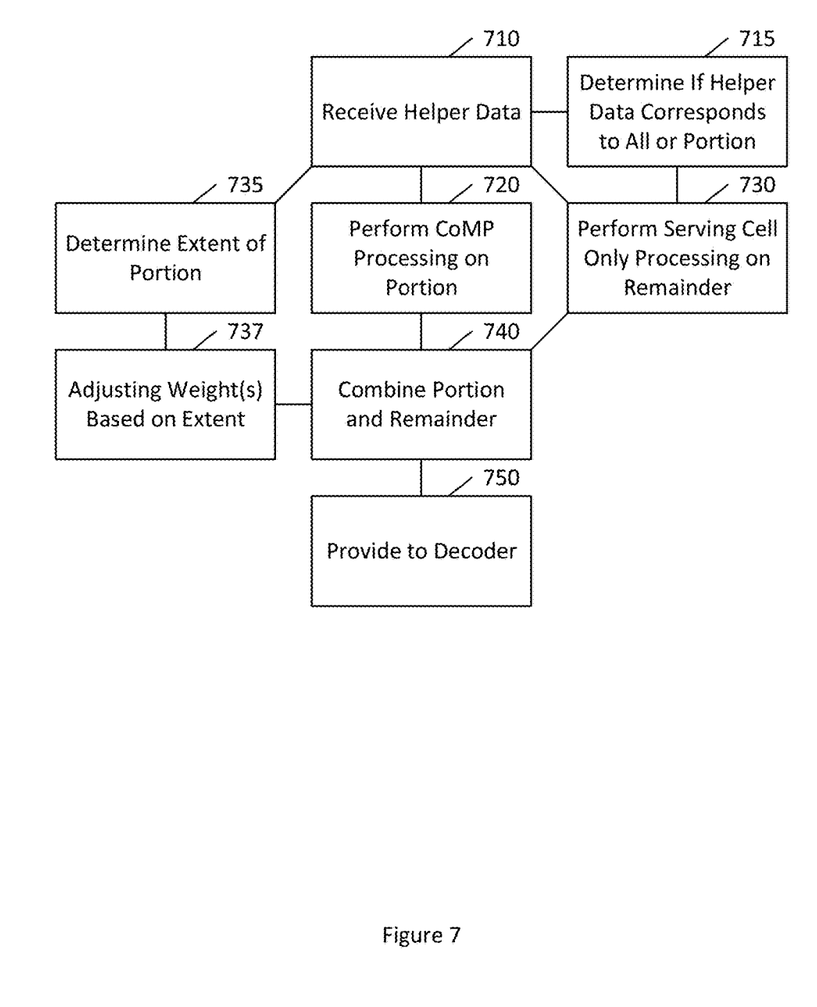
FIG. 7 illustrates a method according to certain embodiments.

FIG. 7 illustrates a method according to certain embodiments. As shown in FIG. 7, a method can include, at 710, receiving helper data corresponding to a portion of an uplink subframe. The portion can include at least one partial data symbol, partial pilot symbol, or partial reference symbol. Alternatively, or in addition, receiving the portion can include receiving a subset of the symbols within the uplink subframe or receiving a subset of carriers within one or more symbols within the uplink subframe. Thus, for example, one or more data symbol may be missing, corrupted, partially received or partially corrupted, the same may be true of a pilot symbol or a reference symbol. Thus, for example, if a data symbol is divided into two packets, one packet may be received or both packets may be received but one may be received with errors, such that it cannot be used. The same may be true of reference symbols or pilot symbols. Furthermore, for a same symbol, there can be multiple carriers. One or more carrier's symbol(s) may be received, while one or more carrier's symbol(s) may be lost or corrupted. Even if it may be possible to request retransmission of a corrupt packet, the packet may be treated as though it were lost, if it is not expected that the retransmission of the packet would arrive within a required time limit for processing.

The helper data can be received from a helping cell, which can be different from a serving cell. In certain embodiments, the serving cell can be a first subcell of a base station or other access point, whereas the helping cell(s) may be other subcell(s) of the same base station or access point, or subcell(s) of neighboring cells. The helper data can be received from a plurality of helping cells. Helper data from at least one of the plurality of helping cells can be present for the portion of the uplink subframe.

The method can also include, at 720, performing coordinated multipoint processing on the portion of the uplink subframe using the helper data. The method can further include, at 730, performing serving cell only equalization on a further portion of the uplink subframe to which the helper data does not correspond.

The method can additionally include, at 740, combining the portion and the further portion to form a complete uplink subframe and, at 750, providing the complete uplink subframe to a decoder.

The method can further include, at 715, determining whether received helper data corresponds to the entire uplink subframe or only to the portion of the uplink subframe. The performing partial coordinated multipoint processing at 720 can be done when the received helper data corresponds only to the portion of the uplink subframe. Otherwise, full coordinated multipoint processing can be performed.

The method can also include, at 735, determining an extent of the portion for which helper data is received. The method can further include, at 737, adjusting at least one weight for combining the portion with a remainder of the uplink subframe. The at least one weight can be pre-calculated or selected from a set of existing weights. For example, the system can predetermine a set of weights to use in various scenarios, such as when combining 2 Rx IRC with 4 Rx IRC, 2 Rx IRC with 6 Rx IRC, and so on. Adjusting the weight(s) can involve selecting one or more of the pre-calculated weights or selecting one or more of the weights from the set of existing weights.

Weights can be calculated using a receiver process at the serving cell. In certain examples, the receiver can be an interference rejection combining (IRC) receiver. The inputs to the IRC receiver can include the channel estimation of each antenna both from the serving cell and the helper cell. The output of the IRC receiver can be the antenna combining weights that can maximize the desired signal while suppressing the undesired signals. If the number of inputs are different, for example if channel estimation is missing due to partial reception of the reference symbols, the output weights can be different.

The weights can then be used to combine the data symbols together to form the final symbols. For example:

$$\text{Final data symbols} = \text{weight1} * \text{data-symbol-from-serving cell} + \text{weight2} * \text{data-symbol-from-helper-cell} \quad \text{(Equation 1)}$$

Channel estimation may need to be performed on the reference symbols to make use of the other symbols. So if the reference symbols from the helper cell are partially received, only partial channel estimation can be fed to the IRC receiver. Weight 1 and weight 2 can be provided for the portion for which the partial reference symbols are available. Additionally, a new weight, weight 3, can be calculated on the portion(s) for which there are no channel estimation inputs due to loss of the reference symbols.

Thus, a new equation can be as follows:

$$\text{Final data symbols} = \text{weight1} * \text{portion of data-symbol-from-serving-cell} + \text{weight2} * \text{portion of data-symbol-from-helper-cell} + \text{weight3} * \text{rest portion of the data-symbol-from-serving-cell} \quad \text{(Equation 2)}.$$

From Equation 1, even if weight1 and weight2 are obtained from fully received helper reference symbols, if data-symbol-from-helper-cell is partially received, Equation 1 may still not be usable. The system can fall back to Equation 2 in the portion for which the system does not have the data-symbol-from-helper-cell.

In summary, based on the availability of full or partial reference symbols received from the helper traffic, the system can perform channel estimation and obtain the weights for combining from the receiver algorithm.

Figure 8:
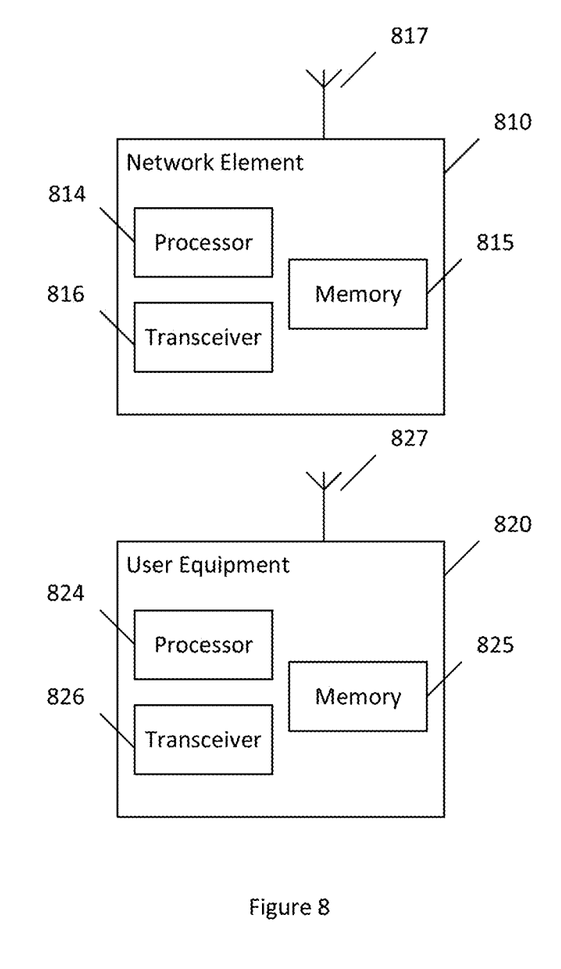
FIG. 8 illustrates a system according to certain embodiments.

FIG. 8 illustrates a system according to certain embodiments of the invention. It should be understood that each block of the flowchart of FIGS. 4 through 7 may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an eNode B (eNB), or any other network element.

Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above when running on or loaded into a computer or a processor. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 820 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 820 may be a sensor or smart meter, or other device that may usually be configured for a single location. The user equipment 820 or network element 810 may include a smaller apparatus, such as a receiver, a modem, or even a single integrated chip component of one those devices, and this smaller apparatus can be configured to perform methods according to certain embodiments of the invention.

In an exemplifying embodiment, an apparatus, such as a node, network element, or user device, may include means for carrying out embodiments described above in relation to FIGS. 4 through 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIGS. 4 through 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Future networks may utilize network functions virtualization (NFV) which is a network architecture concept that proposes virtualizing network node functions into "building blocks" or entities that may be operationally connected or linked together to provide services. A virtualized network function (VNF) may include one or more virtual machines running computer program codes using standard or general type servers instead of customized hardware. Cloud computing or data storage may also be utilized. In radio communications this may mean node operations can be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements that be used include Software-Defined Networking (SDN), Big Data, and all-IP, which may change the way networks are being constructed and managed.

Certain embodiments may have various benefits and/or advantages. Partial UL CoMP can make maximal use of the partial helper data due to packet network impairment. Certain embodiments may provide better overall UL CoMP performance than discarding the partial helper data altogether.

In 5G cloud RAN architecture, UL CoMP can be performed in a centralized location, for example at the edge of the cloud. The UL CoMP can be performed by virtual machines on general purpose processors (GPP). These cases partial UL CoMP can be particularly valuable. In virtualized networks the delay and jitter issue of the antenna data can be affected by the transport path, such as routers, switches, virtual network interfaces, and the like. Additionally, there may be difficulty in maintaining precise time synchronization to the precision required by UL CoMP between and inside virtual machines.

In order to revert to serving only data or for other purposes, certain embodiments can also compute the IRC weights for the local antennas. Additionally, certain embodiments potentially enable UL CoMP functionality in the case of helper data which encounters multi-TTI delays. There may be a need to decode acknowledgment/negative acknowledgment (A/N) first without waiting for the helper data. This may help to avoid delaying the downlink retransmission. Implementing certain embodiments can aid toleration of multi-TTI delays.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving helper data corresponding to a portion of an uplink subframe, wherein the portion comprises at least one partial data symbol, and the at least one partial data symbol represents a portion of at least one complete data symbol;
performing coordinated multipoint processing on the portion of the uplink subframe using the helper data;
determining whether received helper data corresponds to the entire uplink subframe or only to the portion of the uplink subframe; and
performing partial coordinated multipoint processing when the received helper data corresponds only to the portion of the uplink subframe,
wherein the helper data is received from a plurality of helping cells, wherein helper data from at least one of the plurality of helping cells is present for the portion of the uplink subframe.

2. The method of claim 1, further comprising:
performing serving cell only equalization on a further portion of the uplink subframe to which the helper data does not correspond.

3. The method of claim 2, further comprising:
combining the portion and the further portion to form a complete uplink subframe; and providing the complete uplink subframe to a decoder.

4. The method of claim 1, wherein the helper data is received from a helping cell, which is different from a serving cell.

5. The method of claim 1, wherein receiving the portion comprises receiving a subset of the symbols within the uplink subframe or receiving a subset of carriers within one or more symbols within the uplink subframe.

6. The method of claim 1, further comprising:
determining an extent of the portion for which helper data is received; and adjusting at least one weight for combining the portion with a remainder of the uplink subframe.

7. The method of claim 6, further comprising:
determining the at least one weight for combining based on the availability of full or partial reference symbols received in the helper data.

8. An apparatus, comprising: at least one processor; and at least one memory including computer program code,
wherein the at least one memory and the computer program code are configured to, with the at least one processor, cause the apparatus at least to:
receive helper data corresponding to a portion of an uplink subframe, wherein the portion comprises at least one partial data symbol, and the at least one partial data symbol represents a portion of at least one complete data symbol;
perform coordinated multipoint processing on the portion of the uplink subframe using the helper data;
determine whether received helper data corresponds to the entire uplink subframe or only to the portion of the uplink subframe; and
perform partial coordinated multipoint processing when the received helper data corresponds only to the portion of the uplink subframe,
wherein the helper data is received from a plurality of helping cells, wherein helper data from at least one of the plurality of helping cells is present for the portion of the uplink subframe.

9. The apparatus of claim 8, wherein the at least one memory and the computer program code are configured to, with the at least one processor, cause the apparatus at least to perform serving cell only equalization on a further portion of the uplink subframe to which the helper data does not correspond.

10. The apparatus of claim 9, wherein the at least one memory and the computer program code are configured to, with the at least one processor, cause the apparatus at least to: combine the portion and the further portion to form a complete uplink subframe; and provide the complete uplink subframe to a decoder.

11. The apparatus of claim 8, wherein the helper data is received from a helping cell, which is different from a serving cell.

12. The apparatus of claim 8, wherein reception of the portion comprises receiving a subset of the symbols within the uplink subframe or receiving a subset of carriers within one or more symbols within the uplink subframe.

13. The apparatus of claim 8, wherein the at least one memory and the computer program code are configured to, with the at least one processor, cause the apparatus at least to:
determine an extent of the portion for which helper data is received; and
adjust at least one weight for combining the portion with a remainder of the uplink subframe.

14. A non-transitory computer readable medium encoded with instructions that, when executed in hardware, perform a process, the process comprising:
receiving helper data corresponding to a portion of an uplink subframe, wherein the portion comprises at least one partial data symbol, and the at least one partial data symbol represents a portion of at least one complete data symbol;
performing coordinated multipoint processing on the portion of the uplink subframe using the helper data;
determining whether received helper data corresponds to the entire uplink subframe or only to the portion of the uplink subframe; and
performing partial coordinated multipoint processing when the received helper data corresponds only to the portion of the uplink subframe,
wherein the helper data is received from a plurality of helping cells, wherein helper data from at least one of the plurality of helping cells is present for the portion of the uplink subframe.

* * * * *